(12) United States Patent
West et al.

(10) Patent No.: US 12,276,575 B2
(45) Date of Patent: Apr. 15, 2025

(54) SENSOR ASSEMBLY AND REFRIGERANT SENSING SYSTEM

(71) Applicant: Therm-O-Disc, Incorporated, Mansfield, OH (US)

(72) Inventors: Jeffrey A. West, Bellville, OH (US); Jared R. Starling, Mansfield, OH (US)

(73) Assignee: Therm-O-Disc, Incorporated, Westerville, OH (US)

( * ) Notice: Subject to any disclaimer, the term of this patent is extended or adjusted under 35 U.S.C. 154(b) by 347 days.

(21) Appl. No.: 17/849,107

(22) Filed: Jun. 24, 2022

(65) Prior Publication Data

US 2023/0003604 A1 Jan. 5, 2023

Related U.S. Application Data (60) Provisional application No. 63/265,527, filed on Dec. 16, 2021, provisional application No. 63/216,745, filed on Jun. 30, 2021.

(51) Int. Cl.
*F25B 41/40* (2021.01)
*G01M 3/26* (2006.01)

(52) U.S. Cl.
CPC .............. *G01M 3/26* (2013.01); *F25B 41/40* (2021.01); *F25B 2500/222* (2013.01)

(58) Field of Classification Search
CPC ...................... F25B 41/40; F25B 2500/222
See application file for complete search history.

(56) References Cited

U.S. PATENT DOCUMENTS

| 4,818,363 A | * | 4/1989 | Bayha | ................. | G01N 27/407 |
|---|---|---|---|---|---|
| | | | | | 204/426 |
| 5,396,796 A | * | 3/1995 | Kotani | ................ | G01N 27/121 |
| | | | | | 73/431 |
| 6,644,047 B2 | | 11/2003 | Taira et al. | | |

(Continued)

FOREIGN PATENT DOCUMENTS

| CN | 104089383 A | 10/2014 |
|---|---|---|
| CN | 204807165 U | 11/2015 |

(Continued)

OTHER PUBLICATIONS

International Search Report and Written Opinion of the ISA for PCT/US2022/035090, ISA/EPO, mailed Oct. 14, 2022.

(Continued)

*Primary Examiner* — Eric S. McCall
(74) *Attorney, Agent, or Firm* — Harness, Dickey & Pierce, P.L.C.

(57) ABSTRACT

A sensor assembly and a refrigerant sensing system for air conditioning systems can include a sensor controller, a sensor electrically connected to the sensor controller and configured to output sensor data to the sensor controller, and a housing having an interior space enclosing the sensor controller and the sensor. The housing includes a first end and a second end and a barrier disposed between the first end and the second end sealingly separating the interior space. The first end supports the sensor and includes a plurality of openings exposing the sensor to an external environment. The second end supports the sensor controller and substantially prevents the sensor controller from being exposed to the external environment.

20 Claims, 10 Drawing Sheets

(56) References Cited

U.S. PATENT DOCUMENTS

| | | | |
|---|---|---|---|
| 7,395,173 B2* | 7/2008 | Kautz | G01K 7/42 374/E7.042 |
| 7,814,757 B2 | 10/2010 | Zima et al. | |
| 10,041,818 B2 | 8/2018 | Graff et al. | |
| 10,488,065 B2 | 11/2019 | Chen et al. | |
| 10,724,976 B2 | 7/2020 | Rogers et al. | |
| 2003/0235516 A1 | 12/2003 | Osawa et al. | |
| 2008/0107151 A1* | 5/2008 | Khadkikar | G01F 23/22 374/141 |
| 2009/0141433 A1* | 6/2009 | Maloney | G01D 11/24 361/679.01 |
| 2010/0305859 A1* | 12/2010 | Fogarty | G01W 1/06 374/E1.001 |
| 2011/0277541 A1 | 11/2011 | Kadle et al. | |
| 2012/0304752 A1* | 12/2012 | Krommenhoek | G01L 19/14 73/114.76 |
| 2014/0076026 A1* | 3/2014 | Starling | G01N 27/00 73/29.02 |
| 2016/0091241 A1 | 3/2016 | Suzuki et al. | |
| 2016/0178229 A1 | 6/2016 | Chen et al. | |
| 2017/0314805 A1 | 11/2017 | Ikawa et al. | |
| 2018/0195924 A1* | 7/2018 | Patch | G01L 19/147 |
| 2018/0313591 A1 | 11/2018 | Obara et al. | |
| 2019/0170604 A1 | 6/2019 | Kester | |
| 2023/0003601 A1* | 1/2023 | West | F24F 11/89 |
| 2023/0176007 A1* | 6/2023 | West | G01K 1/08 73/31.05 |

FOREIGN PATENT DOCUMENTS

| | | |
|---|---|---|
| CN | 106016450 A | 10/2016 |
| EP | 3159633 B1 | 8/2019 |
| JP | H09274003 A | 10/1997 |
| JP | 2009186424 A | 8/2009 |
| JP | 2016090109 A | 5/2016 |
| JP | 2017-083083 A | 5/2017 |
| JP | 2017-180927 A | 10/2017 |
| JP | 2019052785 A | 4/2019 |
| JP | 2019-203638 A | 11/2019 |
| JP | 6614389 B1 | 12/2019 |
| KR | 101901722 B2 | 11/2018 |
| WO | 2013038704 A1 | 3/2013 |
| WO | 2015029094 A1 | 3/2015 |
| WO | 2016046960 A1 | 3/2016 |
| WO | 2016103785 A1 | 6/2016 |
| WO | 2017002213 A1 | 1/2017 |
| WO | 2017002215 A1 | 1/2017 |
| WO | 2018187450 | 10/2018 |
| WO | 2018198165 A1 | 11/2018 |
| WO | 2019016959 A1 | 1/2019 |
| WO | 2019030796 A1 | 2/2019 |
| WO | 2019097607 A1 | 5/2019 |
| WO | 2019138533 A1 | 7/2019 |
| WO | 2019162993 A1 | 8/2019 |
| WO | 2019234902 A1 | 12/2019 |

OTHER PUBLICATIONS

International Search Report and Written Opinion of the ISA for PCT/US2022/035103, ISA/EPO, mailed Jan. 9, 2023.

Office Action regarding Japanese Patent Application No. 2024514665, dated Jan. 7, 2025 [Translation].

* cited by examiner

SENSOR ASSEMBLY AND REFRIGERANT SENSING SYSTEM

CROSS-REFERENCE TO RELATED APPLICATION

This application claims the benefit of U.S. Provisional Application No. 63/265,527, filed on Dec. 16, 2021 and of U.S. Provisional Application No. 63/216,745, filed on Jun. 30, 2021. The entire disclosures of the above applications are incorporated herein by reference.

TECHNICAL FIELD

The invention set forth in the appended claims relates generally to air conditioning systems and more particularly, but without limitation, to a refrigerant sensor and refrigerant sensor systems for leak detection in air conditioning systems.

BACKGROUND

Hydrocarbon-based refrigerants have been used as working fluids in the heat pump and refrigeration cycle of conventional air conditioning and refrigeration systems. Fluorocarbons, such as chlorofluorocarbons (CFC), hydrochlorofluorocarbons (HCFC) and hydrofluorocarbons (HFC) became commonplace in air conditioning and refrigeration systems in the 20th century due to their favorable thermodynamic properties, their non-flammability, and their non-toxicity. However, while the inert nature of many CFCs and HCFCs made them preferred choices for use as refrigerants in air conditioning and refrigeration systems for many years, that same inert nature contributed to their long lifecycles in the atmosphere. After the discovery of ozone holes in the stratosphere over the polar regions in the early 1980s, air conditioning and refrigeration systems transitioned to hydrofluorocarbon (HFC) refrigerants which were not ozone depleting, such as R-134a, R-143a, and R-410A. In the early 21st century, new refrigerants were developed to be even safer for the environment. These new refrigerants are commonly referred to as lower global warming potential (GWP) refrigerants.

The American Society of Heating, Refrigeration, and Air Conditioning Engineers (ASHRAE) has promulgated standards classifying various refrigerants according to their toxicity and flammability. For example, ASHRAE Standard 34 classifies refrigerants having a lower toxicity as Class A refrigerants, and refrigerants having a higher toxicity as Class B refrigerants. The flammability class of refrigerants is determined according to ASTM E681, Standard Test Method for Concentration Limits of Flammability of Chemicals (Vapors and Gases) at a temperature of 60° C. and a pressure of 101 kPa. According to ASHRAE Standard 34, Class 1 refrigerants do not propagate a flame, Class 2L refrigerants have a lower flammability and a slow flame propagation (for example, a burning velocity less than 10 cm/s), Class 2 refrigerants have lower flammability and faster flame propagation (for example, a burning velocity of greater than 10 cm/s), while Class 3 refrigerants have a higher flammability and faster flame propagation (for example, a burning velocity greater than 10 cm/s). Under the ASHRAE Standard 34, the commonly used R-410A refrigerant has a Class A toxicity classification and a Class 1 flammability classification. Thus, R-410A is referred to as an A1 refrigerant under ASHRAE Standard 34.

New lower GWP refrigerants include but are not limited to refrigerants such as R-1234yf, R-1234ze, R-32, R-454A, R-454C, R-455A, R-447A, R-452B, and R-454B. These refrigerants have a Class A toxicity classification and a Class 2L flammability classification under ASHRAE Standard 34. Thus, these refrigerants may be referred to as A2L refrigerants. Because A2L refrigerants have the ability to propagate a flame, precautions must be taken to prevent the accidental build-up of A2L refrigerants, particularly in enclosed spaces. However, A2L refrigerants will not ignite if their concentration level is below their lower flammability limit. Thus, there is the need to provide apparatus, systems, and methods for detecting A2L refrigerant leaks and the build-up of A2L refrigerants in air conditioning systems.

SUMMARY

New and useful systems, apparatuses, and methods for a sensor are set forth in the appended claims. Illustrative embodiments are also provided to enable a person skilled in the art to make and use the claimed subject matter.

In various implementations, the present disclosure also provides a sensor assembly and a refrigerant sensing system for air conditioning systems.

In one aspect, the present disclosure provides sensor assembly including a sensor controller, a sensor electrically connected to the sensor controller and configured to output sensor data to the sensor controller and a housing. The housing has an interior space and encloses the sensor controller and the sensor. The housing also includes a first end and a second end and a barrier disposed between the first end and the second end and sealingly separating the interior space at the first end from the interior space at the second end. The first end of the housing supports the sensor and the second end of the housing supports the sensor controller. The first end of the housing includes a plurality of openings exposing the interior space of the housing at the first end of the housing and the sensor to an environment external to the housing (e.g., an ambient environment). The housing at the second end encloses the interior space of the housing at the second end and substantially prevents the interior space of the housing at the second end and the sensor controller from being exposed to the environment external to the housing.

In another aspect, the present disclosure provides that the first end of the housing includes a threaded portion on an exterior surface of the first end of the housing. In still another aspect, the second end of the housing has at least one mounting tab projecting from the second end of the housing that is configured to receive a fastener for securing the housing to a support structure.

In yet another aspect, the disclosure provides a heat exchanger system for a refrigeration system comprising a sensor assembly according to the disclosure. The heat exchanger system includes a heat exchanger housing comprising a condensation drain port disposed in a surface of the heat exchanger housing and a heat exchanger supported within the heat exchanger housing. In an aspect of the disclosure, the sensor assembly is attached to the heat exchanger housing.

In another aspect of the disclosure, the condensation drain port of the heat exchanger system has a threaded aperture and the threaded portion of the first end of the housing of the sensor assembly engages the threaded aperture of the condensation drain port such that the first end of the housing of the sensor assembly is disposed inside of the heat exchanger housing and the second end of the housing of the sensor assembly is disposed outside of in the head exchanger housing. Still further, a lock nut engaging the threaded portion of the first end of the housing on an exterior side of the heat exchanger housing is disclosed.

In addition or alternatively, the disclosure provides that a fastener attaches the mounting tab at the second end of the sensor housing to the heat exchanger housing.

In another aspect of the disclosure, a refrigerant sensor system can include a sensor controller, a first refrigerant gas sensor in electrical communication with the sensor controller, and a second refrigerant gas sensor in electrical communication with the sensor controller. The first refrigerant gas sensor is calibrated to detect a first concentration of a refrigerant in air as a percent of volume within a first numeric range and configured to communicate a first output signal to the sensor controller. The second refrigerant gas sensor is calibrated to detect a second concentration of a refrigerant in air as a percent of volume within a second numeric range and configured to communicate a second output signal to the sensor controller. The sensor controller is configured to receive the first output signal and the second output signal, and to at least one of produce a sensor controller output signal, to activate a warning light, to activate a ventilation system, or a combination thereof, responsive to at least one of the first output signal and the second output signal.

In still another aspect of the disclosure, a sensor housing having an interior space can enclose the sensor controller, the first refrigerant gas sensor and the second refrigerant gas sensor. The sensor housing can include a first end and a second end and a barrier disposed between the first end and the second end and sealingly separating the interior space at the first end from the interior space at the second end. The first end of the sensor housing can support the sensor and the second end of the sensor housing can support the sensor controller. The sensor housing, at the first end, includes a plurality of openings exposing the interior space of the sensor housing at the first end and the first refrigerant gas sensor and the second refrigerant gas sensor to an environment external to the sensor housing. The sensor housing, at the second end, substantially separates the interior space of the sensor housing at the second end and the sensor controller from the environment external to the sensor housing.

In yet another aspect of the disclosure, the sensor controller of the refrigerant sensor system is further configured to determine whether the first output signal indicates the first concentration of the refrigerant in the environment external to the housing is greater than a first threshold and to determine whether the second output signal indicates the second concentration of the refrigerant in the environment external to the housing is greater than a second threshold.

In yet another aspect of the disclosure, the sensor controller of the refrigerant sensor system is configured to receive the first output and the second output, and to send an electronic signal, to activate a warning light, to activate a ventilation system, or a combination thereof, responsive to at least one of the first output and the second output.

In yet another aspect of the disclosure, the sensor controller of the refrigerant sensor system is further configured to determine whether the first output indicates the first concentration of the refrigerant in the environment external to the housing is greater than a first threshold and to determine whether the second output indicates the second concentration of refrigerant in the environment external to the housing is greater than a second threshold.

In still another aspect of the disclosure, a heat exchanger system for a refrigeration system can include a refrigerant sensor system, a heat exchanger housing, a heat exchanger supported within the heat exchanger housing, a condensation drain port disposed near a lower end of the heat exchanger housing, and the refrigerant sensor system can be attached to the condensation drain port of the heat exchanger housing.

Objectives, advantages, and a preferred mode of making and using the claimed subject matter may be understood best by reference to the accompanying drawings in conjunction with the following detailed description of illustrative embodiments.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings, as applicable.

DESCRIPTION

The following description of example embodiments provides information that enables a person skilled in the art to make and use the subject matter set forth in the appended claims, but it may omit certain details already well-known in the art. The following detailed description is, therefore, to be taken as illustrative and not limiting.

Figure 1:
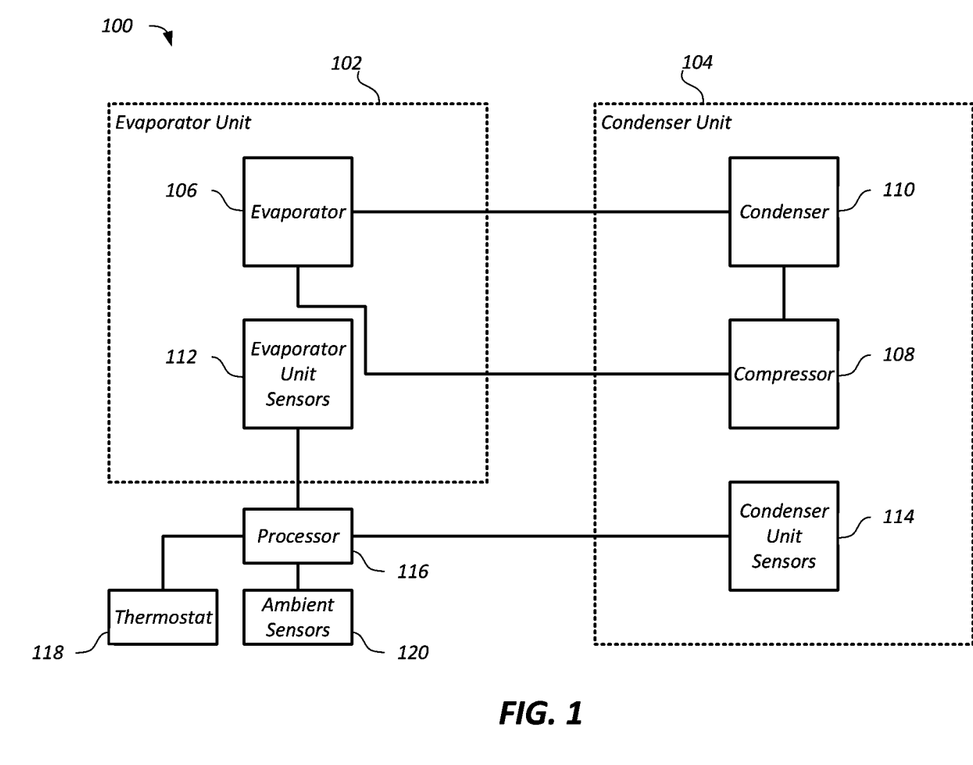
FIG. 1 is a functional block diagram of an example embodiment of a refrigeration cycle system used in heating, ventilation, and air conditioning systems.

FIG. 1 is a functional block diagram of an example embodiment of a refrigeration cycle system 100 used in heating, ventilation, and air conditioning (HVAC) systems. As shown in FIG. 1, some examples of the system 100 may include a refrigeration circuit including an evaporator unit 102 and a condenser unit 104. According to some examples, the evaporator unit 102 may be located indoors and referred to as an indoor unit, while the condenser unit 104 may be located outdoors and referred to as an outdoor unit. The evaporator unit 102 may include an evaporator 106, such as an evaporator coil, and the condenser unit 104 may include a compressor 108 and a condenser 110. The evaporator 106, compressor 108, and the condenser 110 may be fluidly coupled, such as by a pipe, gas line, or liquid line. For example, the evaporator 106 may be fluidly coupled to the compressor 108 by a suction line. In some examples, the evaporator 106 may be fluidly coupled to the condenser 110 by a liquid line. According to exemplary embodiments, the compressor 108 may be fluidly coupled to the condenser 110 by a hot gas line.

The refrigeration cycle system 100 may circulate a working fluid within the refrigeration circuit. The working fluid may contain a refrigerant, such as an air-to-liquid (A2L) refrigerant. For example, the A2L refrigerant may include R-1234yf, R-1234ze, R-32, R-454A, R-454C, R-455A, R-447A, R-452B, or R-454B. Alternatively, the working fluid may be water.

In operation, the compressor 108 may receive the working fluid through a suction port, compress the working fluid, and discharge the compressed working fluid through a discharge port. After the working fluid is compressed by the compressor 108, the working fluid gas may be provided to the condenser 110 in a gas form through the hot gas line. The condenser 110 cools the working fluid, which condenses back into liquid form. The working fluid may be transported from the condenser 110 to the evaporator 106 through the liquid line. At the evaporator 106, heat is absorbed by the working fluid, causing the working fluid to expand into a gas or liquid-gas mixture. As a result of the working fluid's phase change from liquid into gas in the evaporator 106, the temperature of the working fluid is decreased, and the cooled gas may absorb heat energy from the evaporator 106, cooling the exterior of the evaporator 106 in the process. A fan (not shown) may provide airflow over the cooled exterior of the evaporator 106. As the air flows over the cooled exterior of the evaporator 106, the evaporator 106 may absorb heat energy from the flowing air, cooling the air. This cooled air may then be provided via ductwork to an air conditioned environment, such as the interior of a room within a building.

The system 100 may also include various monitoring and control means, such as sensors, thermostats, and processors. For example, evaporator unit sensors 112 may be provided within a housing member of the evaporator unit 102, and condenser unit sensors 114 may be provided within a housing member of the condenser unit 104. The evaporator unit sensors 112 and condenser unit sensors 114 may be operatively coupled to a processor 116. In some examples, a thermostat 118 may be provided to monitor the air conditioned environment. The thermostat 118 may also be operatively coupled to the processor 116. In illustrative embodiments, additional ambient sensors 120 may also be provided and operatively coupled to the processor 116.

Figure 2:
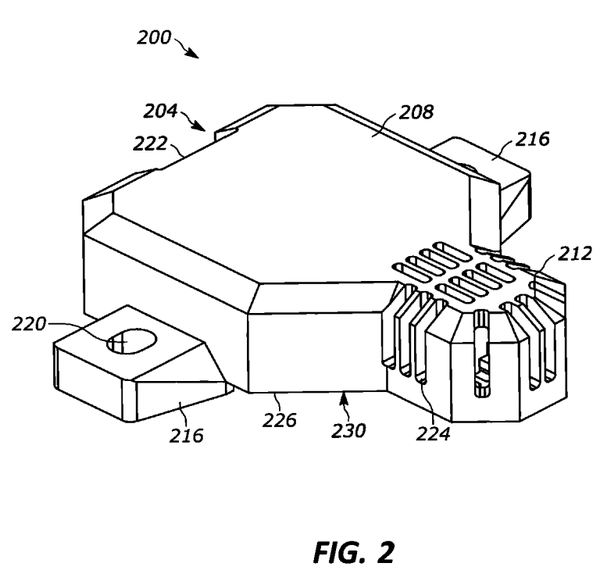
FIG. 2 is a front perspective view of an example sensor assembly disposed in the refrigeration cycle system of FIG. 1.
Figure 3:
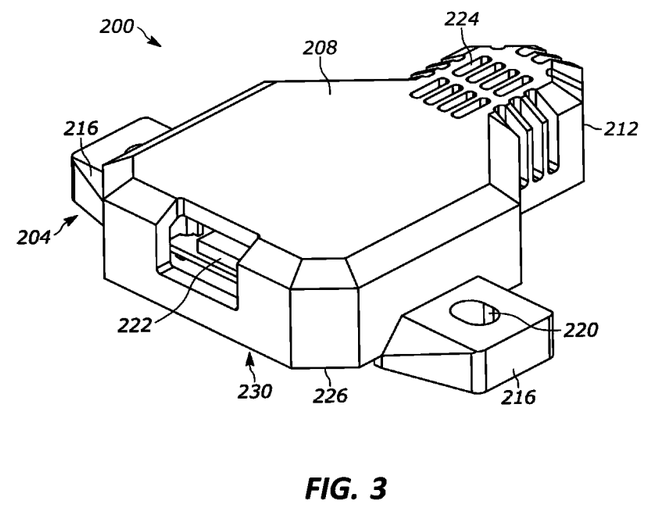
FIG. 3 is a back perspective view of the sensor assembly of FIG. 2.

Now referring to FIGS. 2 and 3, an example sensor assembly 200 is illustrated. The sensor assembly 200 may be an example sensor of the evaporator unit sensors 112, an example sensor of the condenser unit sensors 114, or an example thermostat 118, as previously described. The sensor assembly 200 may be a gas sensor, such as an A2L refrigerant sensor or other gas sensor. For example, the sensor assembly 200 may be disposed in or near the evaporator coil and may sense the presence or accumulation of the working fluid, and particularly the A2L refrigerant, outside of the refrigeration circuit.

The sensor assembly 200 may include a housing 204 that encases an electronics package and at least one sensing element, described below. The housing 204 may be composed of a plastic, or any other suitable material. The housing may be injection molded or formed in another suitable manner. The housing 204 may include a body 208, a head 212, and one or more tabs 216. The body 208, head 212, and tabs 216 may form a single, integral, monolithic part. The head 212 may project from the body 208 and house the sensing portion. The tabs 216 may project from the body 208 and may include apertures 220 for mounting or fixing the housing 204 to a support structure in the refrigeration system 100.

The structure of the housing 204 may allow the sensor assembly 200 to be positioned in a harsh environment, for example the evaporator coil. The body 208 for the housing 204 may be solid for protecting the sensor electronics package, including a main processing board, described below. The housing 204 may define an opening 222 on a side of the body 208 for attachment to a connector (described below) housed within the body 208. For example, the opening 222 may be disposed on a side of the housing opposite the head 212 to position the opening farthest from the environment in which the head 212 is positioned. In some examples, the head 212 of the housing 204 may be positioned in a harsh environment while the body 208 is in a space sheltered from the environment. By positioning the opening 222 farthest from the head 212, the opening 222 is positioned farthest from the harsh environment as well.

The housing 204 may include a plurality of openings or slots 224 formed on the head 212. The slotted head 212 allows the sensing element, described below, to be exposed to the environment for sensing. The slots 224 may be sized such that they minimize or prohibit dirt, condensation, lint, oil, etc. from passing through the head 212 and sensor element, but such that water vapor (or working fluid vapor) is allowed to pass through. Although not illustrated the head 212 may include a filter or filter membrane positioned on an inside surface of the head 212 adjacent the slots 224 to provide additional filtering for undesirable particles or contaminants.

The housing 204 may include a cover or lid 226 on a base 230 of the housing 204 that provides access to an interior space or cavity in the housing 204.

Figure 4:
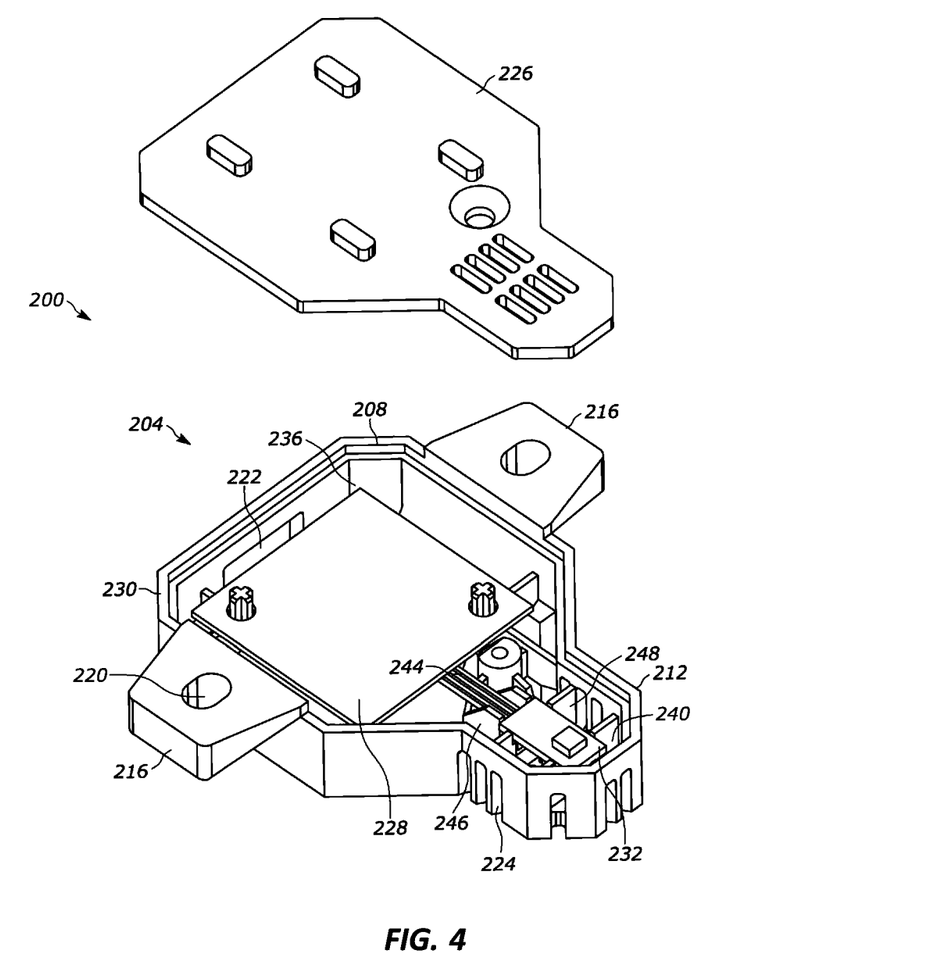
FIG. 4 is a perspective view of the bottom of the sensor assembly of FIG. 2 with a cover removed.

Now referring to FIG. 4, the sensor assembly 200 is illustrated with the lid 226 removed. The housing 204 may encase and support an electronics package including a main processing unit 228 and a sensor 232 that are separately located within the housing 204. For example, the main processing unit 228 may be disposed within a cavity 236 defined by the body 208, and the sensor 232 may be disposed within a cavity 240 defined by the head 212. The main processing unit 228 may be electrically connected to the sensor 232 by one or more wires 244. For example, the wires 244 may include a ribbon cable.

One or more barriers 246 may be disposed on opposing sides of the wires 244. The barriers 246 may provide sealing and/or may separate the cavity 236 of the body 208 from the cavity 240 of the head 212. The barriers 246 may be projections integral with the housing 204.

A vent 248, or gap, may be formed around a perimeter of the sensor 232 to space the sensor 232 from the housing 204. For example, projections, similar to the barriers 246 may be formed integral with the housing 204 and positioned around the perimeter of the sensor 232 to support the sensor 232 and space the sensor 232 from the housing 204 creating the vent 248. For example, the vent 248 may be within a range of 1-8 mm in depth, and more specifically about 5 mm.

Figure 5:
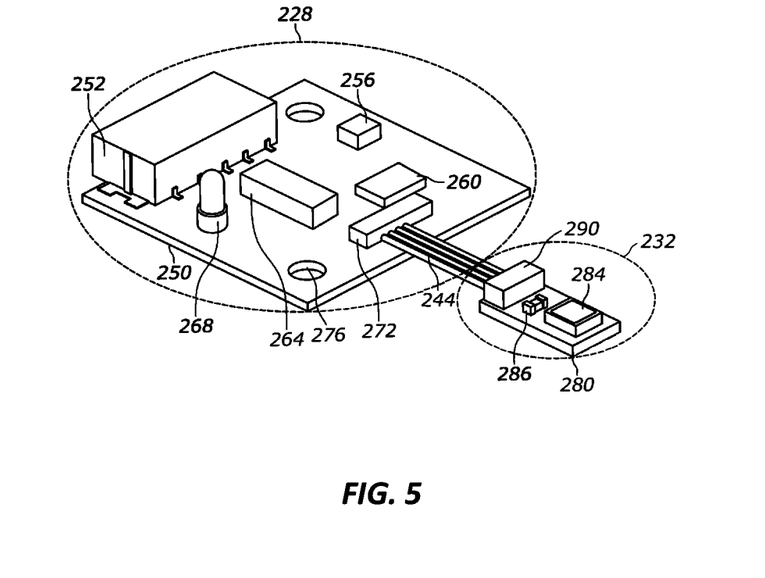
FIG. 5 is a perspective view of an electronics package for the sensor assembly of FIG. 3, including a processor and a sensor.

FIG. 5 illustrates the main processing unit 228 and sensor 232 assembly outside of the housing 204. The main processing unit 228 may include a motherboard 250, on which a connector 252, a voltage regulator 256, a microprocessor 260 (or controller), a signal conditioner 264, a signal light 268 (for example, a light-emitting diode, LED), and a sensor connector 272 may be mounted. The motherboard 250 may be sized to fit within the cavity 236 defined by the body 208. For example, the motherboard 250 may be within a range of 23-27 millimeters (mm), and more specifically 25 mm, in width, within a range of 23-27 mm, and more specifically 25 mm, in length, and within a range of 0.5-2.0 mm, and more specifically 1 mm, in height. The motherboard 250 may include one or more apertures 276 for mounting the main processing unit 228 within the housing 204.

The connector 252 may be a universal serial bus (USB) to serial (such as transistor-transistor logic, TTL interface) converter (for example, a Future Technology Devices International™, FTDI™) connector configured to receive a cable and transmit an output signal from the sensor assembly 200. The connector 252 may be positioned on an end of the motherboard 250 such that the connector 252 aligns with the opening 222 in the body 208 of the housing (FIG. 3).

The microprocessor or controller 260 may communicate with the sensor 232 through the sensor connector 272, the voltage regulator 256, the signal conditioner 264, and the signal light 268 to control the various functions of the sensor assembly 200. The controller 260 may additionally output a sensor output signal though the connector 252. Wiring may transmit the sensor output signal from the connector 252 to various external controllers. For example, the controller 260 may be a microprocessor or microcontroller.

The sensor 232 may include a sensor board 280 on which one or more sensor chips 284, 286 and a connector 290 may be mounted. The connector 290 may connect to the sensor connector 272 through wiring 244. The sensor chips 284, 286, for example, may include an A2L sensor chip 284 and any environmental sensing circuits 286. The sensor board 280 may be sized to fit within the cavity 240 defined by the head 212. For example, the sensor board 280 may be within a range of 4-7 millimeters (mm), and more specifically 5-6 mm, in width, within a range of 9-12 mm, and more specifically 10-11 mm, in length, and within a range of 0.5-2.0 mm, and more specifically 1 mm, in height.

Figure 6A:
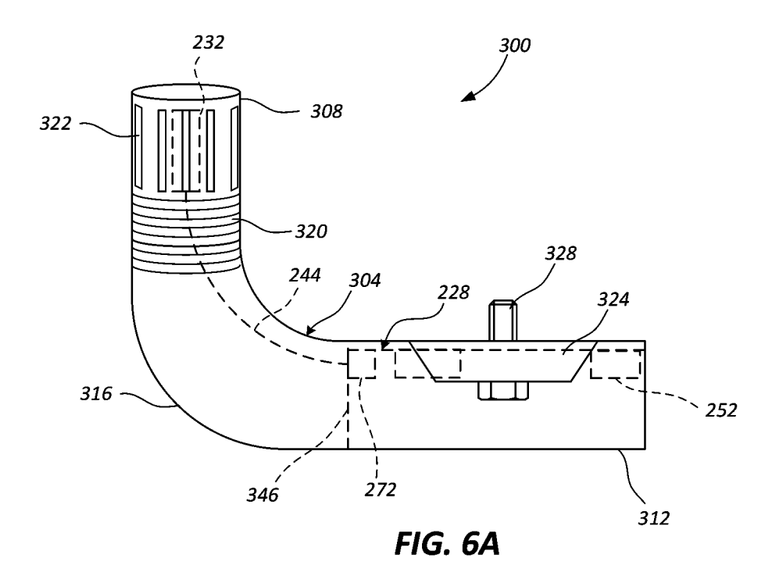
FIG. 6A is a perspective view of another example sensor assembly disposed in the refrigeration cycle system of FIG. 1.
Figure 6B:
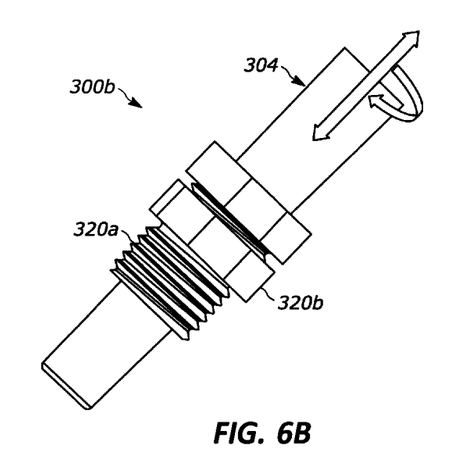
FIGS. 6B and 6C show perspective of still other example sensor assemblies according to the present disclosure.
Figure 6C:
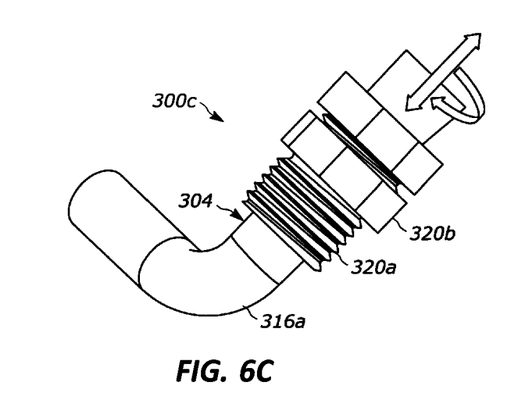

Referring to FIGS. 6A, 6B and 6C, additional exemplary sensor assemblies 300, 300b and 300c are illustrated. Referring to FIG. 6A, the sensor assembly 300 may include the same components as sensor assembly 200, except that the components of sensor assembly 300 may be arranged to fit within an access port in a heat exchanger, as described below. Like numbers indicate the same parts between sensor assembly 200 and sensor assembly 300 and will, therefore, not be described.

For example, sensor assembly 300 includes a housing 304 that encloses the sensor 232 and the main processing unit 228. The housing 304 may be a tubular housing formed of metal, plastic, polyvinyl chloride (PVC), or any other suitable material. The housing 304 can take a variety of configurations and/or shapes including, for example, a straight-walled, hollow cylindrical tube and a bent-walled, hollow tube having an angled portion or elbow 316, 316a. The housing 304 can define an interior space and have a first end 308 and a second end 312. One or more barriers 346 may provide sealing and/or may separate the interior space of the hollow housing between the first end 308 of the housing 304 and the second end 312 of the housing 304.

The housing 304 may include a plurality of openings or slots 322 formed in the first end 308. The slots 322 may be sized such that they minimize or prohibit dirt, condensation, lint, oil, etc. from passing from outside of the housing 304 and into the interior space of the first end 308 of the housing, but such that water vapor (or working fluid vapor) is allowed to pass through. The first end 308 of the housing 304 may additionally include a filter or filter membrane positioned on an inside surface, adjacent the slots 322 to provide additional filtering for undesirable particles or contaminants.

The first end 308 of the housing 304 and the second end 312 of the housing 304 may be connected by an elbow 316. For example, the elbow 316 may be a 90° elbow. The first end 308 of the housing 304 may optionally include a threaded portion 320.

The sensor 232 can be supported in the first end 308 of the housing 304. The slots 322 in the first end 308 allow the sensor 232 to be exposed to the ambient environment for sensing. For example, the sensor 232 may be positioned in at or near the first end 308 of the housing 304. The main processing unit 228 may be supported in the second end 312 of the housing 304. For example, the main processing unit 228 may be positioned at or near the second end 312 of the housing 304. The main processing unit 228 may include the connector 272, the controller 260, the connector 252, the voltage regulator 256, the signal conditioner 264, and the signal light 268 (for example, a light-emitting diode, LED). The sensor 232 can be electrically connected to the main processing unit 228 by one or more wires 244 (e.g., a ribbon cable) that is routed through the interior space of the housing 304 between the sensor 232 and the main processing unit 228. The wires 244 can pass through the barrier 346 in a sealed manner so that the interior space remains separated between the first end 308 and second end 312.

The second end 312 of the housing 304 may include tabs 324 that project from the second end 312 of the housing 304. The tabs 324 may cooperate with a fastening device for securing the housing 304 on a housing of a support structure, such as a heat exchanger, as described below. For example, the tabs 324 may receive a fastener 328 that can affix the sensor assembly to the support structure. Alternatively, or in addition, the housing 304 may include the threaded portion 320 that can also engage with a mating threaded portion of a support structure, such as a heat exchanger, as described below.

Figure 7:
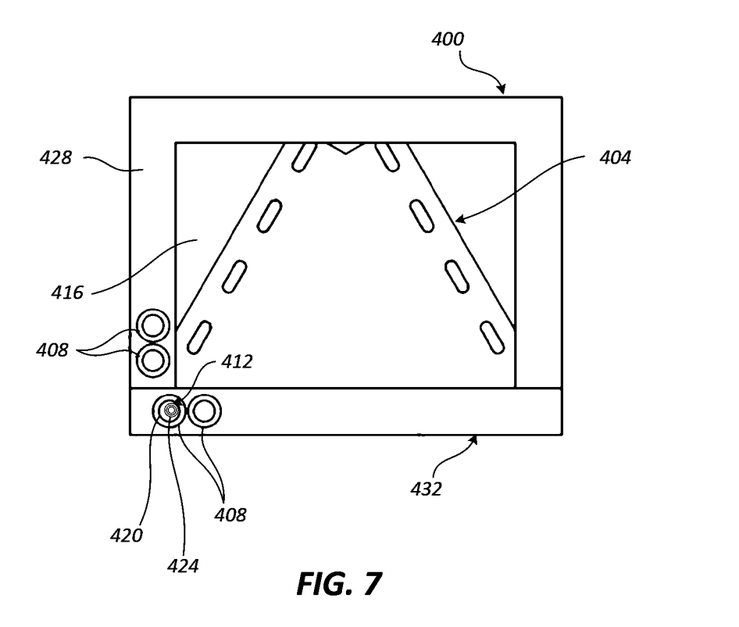
FIG. 7 is a schematic representation of an example heat exchanger system having a port for receiving an example sensor assembly of the present disclosure.

Now referring to FIG. 7, a housing 400 for a heat exchanger 404 (for example, an evaporator, a condenser, etc.) is illustrated. The housing 400 may be a drain tray positioned on a bottom of the heat exchanger 404 and configured to collect condensation or leaking fluids from the heat exchanger 404. The housing 400 may include one or more access ports 408 for receiving the housing 304 of the sensor assembly 300. The access ports 408 may be positioned along a side or a bottom of the housing 400. In some examples, the access ports 408 may also be configured to drain the housing 400 of any fluids collected therein.

For example the access ports 408 may define an aperture 412 providing access to an interior 416 of the housing 400 where the heat exchanger 404 is located. An internal wall 420 of the access port 408 may include a plurality of female threads 424 that engage with the threaded portion 320 of the housing 304 of the sensor assembly 300.

Alternatively, the internal wall 420 of the port 408 may provide a quick-connect receiver (not shown) for connecting the housing 304 of the sensor assembly 300.

When installed, the first end 308 of the sensor assembly 300 may be inserted within the port 408. The sensor assembly 300 may be rotated such that the threads 320 on the housing 304 engage the threads 424 on the access port 408. The sensor assembly 300 may be inserted within the port 408 until the first end 308 of the sensor assembly 300 extends into the interior space 416 of the housing 400.

Alternatively, the sensor assembly 300 and access port 408 may have a quick-connect engagement for fast and easy assembly and disassembly.

The sensor assembly 300 may be inserted in an access port 408 that positions the sensor assembly 300 near the bottom of the housing 400 but protects the sensor assembly 300 from being submerged in fluid. For this reason, the access ports 408 along a vertical side 428 of the housing 400 may be more acceptable for use than the access ports 408 along a base 432 of the housing 400.

When the sensor assembly 300 has been inserted within the access port 408 such that the first end 308 extends into the interior space 416, the second end 312 of the sensor assembly 300 is secured to the housing 400. For example, the fasteners 328 (such as a screw, a bolt, adhesive, welding, etc.) may be inserted through apertures (similar to apertures 220) in the tabs 324 and secured to the housing 400. For example, the fastener 328 may be a removable fastener (such as a screw, a bolt, a removable adhesive, etc.) such that the sensor assembly 300 may be removed from the housing 400 for cleaning, etc.

Alternatively, the second end 312 of the sensor assembly 300 may not be fastened to the housing 400 and the sensor assembly 300 may be secure to the housing 400 only through engagement between the threaded portion 320 and threads 424.

In another aspect shown in FIGS. 6B and 6C, the sensor assembly 300b, 300c can alternatively include a threaded sleeve 320a and a lock nut 320b. The threaded sleeve 320a can be disposed on or incorporated into the exterior of the tubular housing 304. The threaded sleeve 320a can engage the corresponding threads 424 of the access port 408 to install the sensor assembly 300b, 300c to the housing 400. The lock nut 320b can also engage the threaded sleeve 320a and serve to secure the sensor assembly 300b, 300c in position when installed in the housing. In this respect, the threaded sleeve 320a can engage the threads 424 to axially locate and rotationally orient the sensor assembly 300b, 300c as desired in the interior space 416 of the housing. At the desired placement, the lock nut 320b can be tightened on the threaded sleeve 320a and/or against the housing 400 to affix the sensor assembly 300b, 300c in place. Of course, a threaded sleeve and lock nut arrangement may also be employed in the sensor assembly 300 to the same effect.

When the sensor assembly 300, 300b, 300c is positioned in the housing 400, the sensor 232 is configured to sense the presence of refrigerant. Refrigerant gasses are generally heavier than air and will collect at or near the base 432 of the housing 400. Accordingly, the sensor 232 positioned near the base 432 by the sensor assembly 300, 300b, 300c will be able to sense the presence of refrigerant gasses. The slots 322 in the housing 304 of the sensor assembly provide additional exposure to the environment in the internal space 416 of the housing 400.

During maintenance or cleaning of the sensor assembly 300, 300b, 300c, the sensor assembly may be rotated to disengage the threads 320, 320a from the threads 424 and remove the sensor assembly 300, 300b, 300c from the access port 408. In some examples, prior to rotating the sensor assembly 300, the second end 312 of the sensor assembly 300 may be unfastened from the housing 400 by removing the fastener that attaches the tabs 324 to the housing 400. After maintenance or cleaning, the sensor assembly 300 may be re-installed as previously described.

The sensor assembly 300, 300b, 300c is advantageous because it takes advantage of existing structures in the housing 400 without requiring modification of existing heat exchanger housing or manufacture of new heat exchanger housing. For example, the access ports 408 are existing condensation drain holes in the housing 400. The use of existing structures allows the sensor assembly 300, 300b, 300c to be easily retrofitted on existing heat exchanger assemblies or easily included in new heat exchanger assemblies. Generally, four (4) condensation drain holes, access points, or access ports 408 are included on a heat exchanger housing 400. However, only one of those access ports 408 are used as a condensate drain, leaving 3 remaining access points unused. Thus, assembly of the sensor assembly 300 does not cause conflict with an already-used access port 408.

Figure 8:
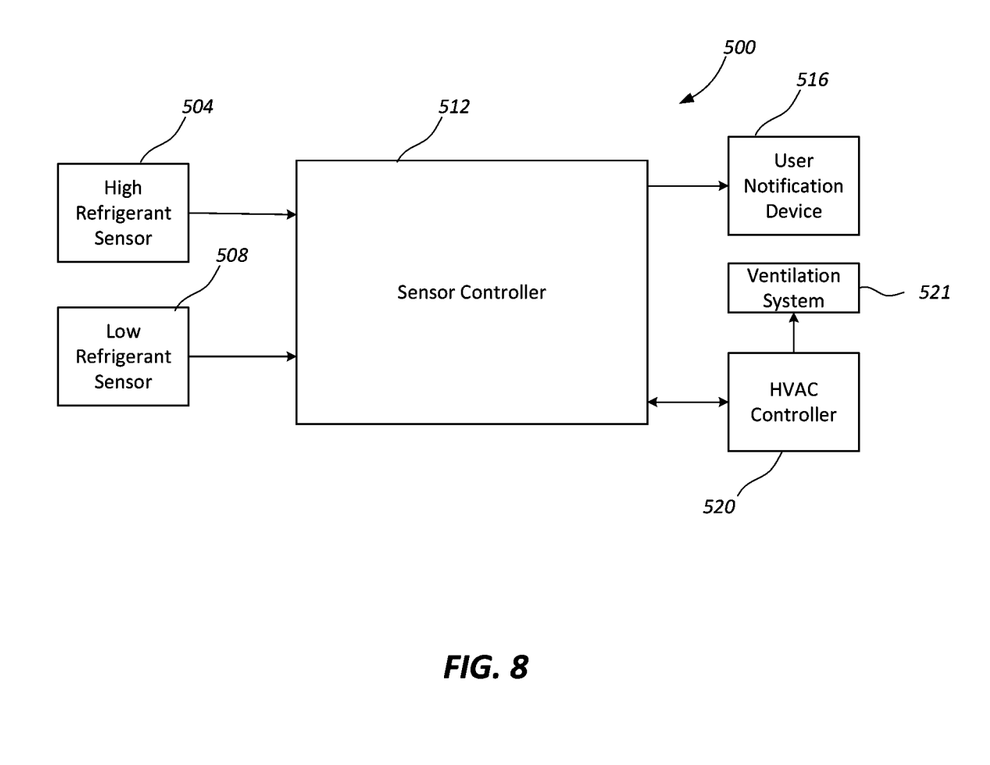
FIG. 8 is a functional block diagram of an example refrigerant sensing system used in the refrigeration cycle system of FIG. 1.

Now referring to FIG. 8, a functional block diagram for an example sensor assembly 500 is illustrated. The sensor assembly 500 may be the same or similar to sensor assemblies 200 and 300, except that sensor assembly 500 may include a high concentration refrigerant gas sensor 504 and a low concentration refrigerant gas sensor 508. The high concentration refrigerant gas sensor 504 and low concentration refrigerant gas sensor 508 may be in communication with a sensor controller 512, which, in turn, may be in communication with one or more user notification devices 516, such as a warning light, audible alarm, display or other signal, and an HVAC controller 520.

The high concentration refrigerant gas sensor 504 may be calibrated to detect refrigerant levels within a first range. The first range may be greater than 0.1% concentration in air by volume, or between about 0.01% and about 100% concentration in air by volume, or from about 1.4% to about 50% concentration in air by volume, or from about 3.5% to about 30% concentration in air by volume.

The high concentration refrigerant gas sensor 504 may detect refrigerant levels above a first refrigerant threshold. For example, the first refrigerant threshold may be a safety threshold as outlined by the Air-Conditioning, Heating, and Refrigeration Institute (AHRI). For example, the first refrigerant threshold may range from about 1% to about 25% concentration in air by volume of a lower flammability limit (LFL), from about 12% to about 22% concentration LFL, or from about 14% to about 20% concentration LFL. The first refrigerant threshold may comply with the safety standards for impermissible leaks where intervention, such as mechanical ventilation, is required.

The low concentration refrigerant gas sensor 508 may be calibrated to detect refrigerant levels within a second range. The second range may be less than the first range. The low level threshold may be used for advanced detection of leaks. For example, the second range may be less than 20% concentration in air by volume, or between about 0% and about 20% concentration in air by volume, or from about 0% to about 5% concentration in air by volume, or from about 0.01% to about 0.1% concentration in air by volume.

The low refrigerant senor 508 may detect refrigerant levels above a second refrigerant threshold. For example, the second refrigerant threshold may provide early notification of small leaks before the safety threshold is reached. For example, the second refrigerant threshold may range from about 0.001% to about 10% concentration in air by volume, from about 0.01% to about 5% concentration in air by volume, or from about 0.01% to about 0.1% concentration in air by volume.

The high concentration refrigerant gas sensor 504 and the low concentration refrigerant gas sensor 508 may be calibrated to detect different thresholds to provide accurate, reliable detection of refrigerant leaks. The high concentration refrigerant gas sensor 504 calibrated to the safety threshold may provide less accuracy at lower refrigerant concentrations and therefore may not provide as accurate and reliable detection at low refrigerant concentrations needed for proactive detection. Accordingly, unreliable detection could result in nuisance alarms. Adding the low concentration refrigerant gas sensor 508 which is calibrated for detecting low refrigerant concentrations, therefore, reduces nuisance alarms by providing high accuracy at low refrigerant concentration levels.

During assembly, the high concentration refrigerant gas sensor 504 and the low concentration refrigerant gas sensor 508 may both be disposed in the first end 308 of the housing 304 of the sensor assembly 300. The high concentration refrigerant gas sensor 504 and the low concentration refrigerant gas sensor 508 may therefore both be positioned within one port 408 in the housing 400. Alternatively, the housing 304 of the sensor assembly 300 may be modified to branch into two first ends 308, with one of the two first ends 308 housing the high concentration refrigerant gas sensor 504 and another of the two first ends 308 housing the low concentration refrigerant gas sensor 508. The high concentration refrigerant gas sensor 504 and the low concentration refrigerant gas sensor 508 may therefore be positioned within different ports 408 in the housing 400. The different ports 408 may be adjacent ports 408, such as the adjacent ports 408 on the vertical side 428 of the housing 400 or the adjacent ports 408 on the base 432 of the housing 400.

The sensor controller 512 may receive signals from the high concentration refrigerant gas sensor 504 and the low concentration refrigerant gas sensor 508. If the high concentration refrigerant gas sensor 504 provides an output indicative of a refrigerant concentration level greater than the first threshold, the sensor controller 512 may actuate a user notification apparatus 516, such as an indicator/warning light, an audible alarm, and/or an electronic message, to inform a user of the leak, and/or send a signal to the HVAC controller 520 to actuate a mechanical ventilation system(s) 521 (for example, exhaust fans, heat exchanger fans, etc.) to ventilate the space and disperse the refrigerant gas, or a combination of these.

If the low concentration refrigerant gas sensor 508 provides an output indicative of a refrigerant concentration level greater than the second threshold, the sensor controller 512 may actuate the user notification device 516, such as an indicator/warning light, an audible alarm and/or an electronic message, to inform a user of the need for maintenance.

Figure 9:
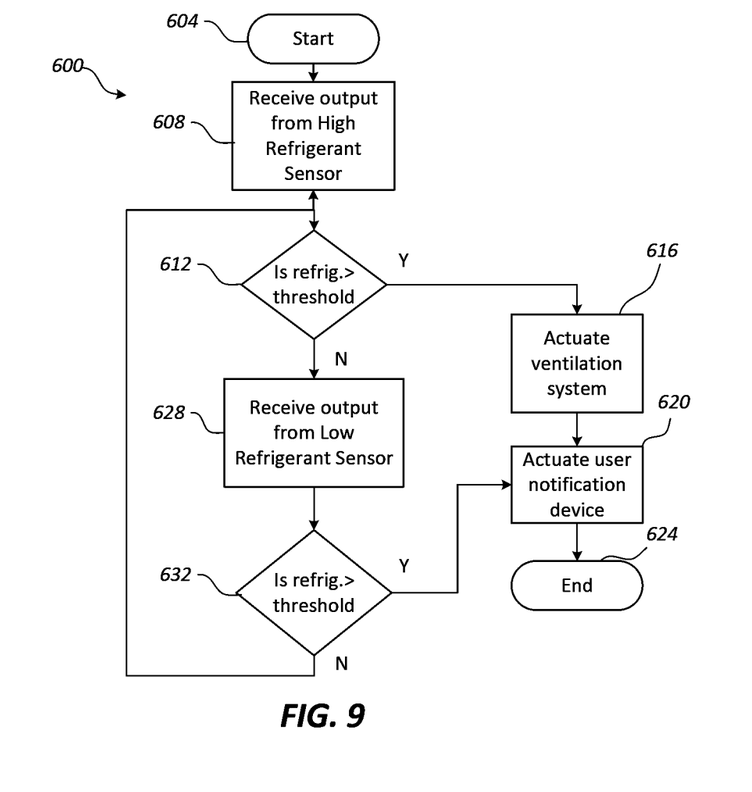
FIG. 9 is a flow chart of an example method of monitoring refrigerant in the refrigeration cycle system of FIG. 1.

Now referring to FIG. 9, a flowchart for a method 600 of controlling a sensor assembly is illustrated. Method 600 begins at 604. At 608, an output from the high concentration refrigerant gas sensor 504 is received. For example, the sensor controller 512 may receive an output from the high concentration refrigerant gas sensor 504 indicating a refrigerant concentration.

At 612, an evaluation of the refrigerant concentration data determines whether the current refrigerant concentration is greater than a first refrigerant threshold. For example, the sensor controller 512 determines whether the output from the high concentration refrigerant gas sensor 504 is indicative of a refrigerant concentration level greater than the first refrigerant threshold. For example, the first refrigerant threshold may be a safety threshold as outlined by the Air-Conditioning, Heating, and Refrigeration Institute (AHRI). For example, the first refrigerant threshold may range from about 1% to about 25% concentration of a lower flammability limit (LFL), from about 12% to about 22% concentration LFL, or from about 14% to about 20% concentration LFL. The first refrigerant threshold may comply with the safety standards for impermissible leaks where intervention, such as mechanical ventilation, is required.

If true at 612, a mechanical ventilation system may be actuated at 616. For example, the sensor controller 512 may send a signal to the HVAC controller 520 to actuate mechanical ventilation systems (for example, exhaust fans, heat exchanger fans, etc.) to ventilate the space and/or disperse the refrigerant gas.

At 620, a warning light may be illuminated. For example, the sensor controller 512 may actuate the user notification device(s) 516, such as an indicator/warning light, audible alarm or electronic message. The indicator/warning light may be an LED light positioned to indicate to a user that there is a leak in the system. Additionally, the sensor controller 512 may actuate an audible alarm or send an electronic message to inform a user of the leak.

At 624 method 600 ends.

If false at 612, an output from the low concentration refrigerant gas sensor 508 is received at 628. For example, the sensor controller 512 may receive an output from the low concentration refrigerant gas sensor 508 indicating a refrigerant concentration.

At 632, an evaluation of the refrigerant concentration data determines whether the current refrigerant concentration is greater than a second refrigerant threshold. For example, the sensor controller 512 may determine whether the output from the low concentration refrigerant gas sensor 508 is indicative of a refrigerant concentration level that exceeds the second refrigerant threshold. For example, the second refrigerant threshold may provide early notification of small leaks before the safety threshold is reached. For example, the second refrigerant threshold may range from about 001% to about 10% concentration in air by volume, from about 0.01% to about 5% concentration in air by volume, or from about 0.01% to about 0.1% concentration in air by volume.

If false at 632, the method 600 may return to 608.

If true at 632, the warning light may be illuminated at 620. For example, the sensor controller 512 may actuate the user notification device(s) 516, such as an indicator/warning light, audible alarm or electronic message. The warning light may be an LED light positioned to indicate to a user that there is a leak in the system. Additionally, the sensor controller 512 may actuate an audible alarm or send an electronic message to inform a user of the low leak.

Method 600 ends at 624.

While shown in a few illustrative embodiments, a person having ordinary skill in the art will recognize that the systems, apparatuses, and methods described herein are susceptible to various changes and modifications that fall within the scope of the appended claims. Moreover, descriptions of various alternatives using terms such as "or" do not require mutual exclusivity unless clearly required by the context, and the indefinite articles "a" or "an" do not limit the subject to a single instance unless clearly required by the context. Components may be also be combined or eliminated in various configurations for purposes of sale, manufacture, assembly, or use.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described in the context of some embodiments may also be omitted, combined, or replaced by alternative features serving the same, equivalent, or similar purpose without departing from the scope of the invention defined by the appended claims.

What is claimed is:

1. A refrigerant sensor system comprising:
a sensor controller;
a first refrigerant gas sensor in electrical communication with the sensor controller, the first refrigerant gas sensor calibrated to detect a first concentration of a refrigerant in air as a percent of volume within a first numeric range and configured to communicate a first output signal to the sensor controller;
a second refrigerant gas sensor in electrical communication with the sensor controller, the second refrigerant gas sensor calibrated to detect a second concentration of the refrigerant in air as a percent of volume within a second numeric range and configured to communicate a second output signal to the sensor controller;
wherein the sensor controller is configured to receive the first output signal and the second output signal, and to at least one of produce a sensor controller output signal, to activate a warning light, to activate a ventilation system, or a combination thereof, responsive to at least one of the first output signal and the second output signal;
a sensor housing having an interior space and enclosing the sensor controller, the first refrigerant gas sensor and the second refrigerant gas sensor, the sensor housing including a first end and a second end and a barrier disposed between the first end and the second end and sealingly separating the interior space at the first end from the interior space at the second end, the first end of the sensor housing supporting both the first refrigerant gas sensor and the second refrigerant gas sensor, and the second end of the sensor housing supporting the sensor controller, the sensor housing at the first end including a plurality of openings exposing the interior space of the sensor housing at the first end and the first refrigerant gas sensor and the second refrigerant gas sensor to an environment external to the sensor housing, the sensor housing at the second end substantially separating the interior space of the sensor housing at the second end and the sensor controller from the environment external to the sensor housing.

2. The refrigerant sensor system of claim 1 wherein the sensor controller is further configured to determine whether the first output signal indicates the first concentration of the refrigerant in the environment external to the sensor housing is greater than a first threshold and to determine whether the second output signal indicates the second concentration of the refrigerant in the environment external to the sensor housing is greater than a second threshold.

3. The refrigerant sensor system of claim 2 wherein the first numeric range is between about 0.01 percent and about 100 percent;
wherein the first threshold is between about 1 percent and about 25 percent;
wherein the second numeric range is between 0 percent and about 20 percent; and
wherein the second threshold is between about 0.001 percent and about 10 percent.

4. The refrigerant sensor system of claim 3 wherein the first numeric range is between about 1.4 percent and about 50 percent; and
wherein the second numeric range is between 0 percent and about 5 percent.

5. The refrigerant sensor system of claim 4 wherein the first numeric range is between about 3.5 percent and about 30 percent; and
wherein the second numeric range is between 0.01 percent and about 0.1 percent.

6. The refrigerant sensor system of claim 1 wherein the first end of the sensor housing further comprises a membrane positioned on an inside surface of the sensor housing adjacent to the plurality of openings.

7. The refrigerant sensor system of claim 6 wherein the sensor housing comprises one of a straight-walled hollow tube, a bent-walled hollow tube having an angled portion and a hollow tube having a ninety-degree elbow.

8. A heat exchanger system for a refrigeration system comprising the refrigerant sensor system according to claim 1;
a heat exchanger housing;
a heat exchanger supported within the heat exchanger housing;
a condensation drain port disposed near a lower end of the heat exchanger housing; and
wherein the refrigerant sensor system according to claim 1 is attached to the condensation drain port of the heat exchanger housing.

9. The heat exchanger system of claim 8 further comprising a fastener;
wherein the second end of the sensor housing comprises at least one mounting tab projecting from the second end of the sensor housing; and
wherein the fastener attaches the at least one mounting tab to the heat exchanger housing.

10. The heat exchanger system of claim 8 wherein the sensor controller is further configured to determine whether the first output signal indicates the first concentration of the refrigerant in the environment external to the sensor housing is greater than a first threshold and to determine whether the second output signal indicates the second concentration of the refrigerant in the environment external to the sensor housing is greater than a second threshold.

11. The heat exchanger system of claim 8 wherein the first end of the sensor housing comprises a threaded portion on an exterior surface of the first end of the sensor housing;
wherein the condensation drain port comprises a threaded aperture; and
wherein the threaded portion of the first end of the sensor housing engages the threaded aperture of the condensation drain port such that the first end of the sensor housing and the first refrigerant gas sensor and the second refrigerant gas sensor are disposed inside of the heat exchanger housing and the second end of the sensor housing is disposed outside of in the heat exchanger housing.

12. The heat exchanger system of claim 11 further comprising a lock nut engaging the threaded portion of the first end of the sensor housing on an exterior side of the heat exchanger housing.

13. A heat exchanger system for a refrigeration system comprising:
a heat exchanger housing comprising an aperture;
a sensor assembly comprising:
a sensor controller;
a sensor electrically connected to the sensor controller and configured to output sensor data to the sensor controller;
a sensor housing having an interior space and enclosing the sensor controller and the sensor, the sensor housing including a first end and a second end and a barrier disposed between the first end and the second end and sealingly separating the interior space at the first end from the interior space at the second end, the first end of the sensor housing supporting the sensor and the second end of the housing supporting the sensor controller, the sensor housing at the first end including a plurality of openings exposing the interior space of the sensor housing at the first end and the sensor to an environment external to the sensor housing, the sensor housing at the second end enclosing the interior space of the sensor housing at the second end and substantially prohibiting the interior space of the sensor housing at the second end and the sensor controller from being exposed to the environment external to the sensor housing;

wherein the first end of the sensor housing is threadably attached to the aperture of the heat exchanger housing such that the first end of the sensor housing is disposed inside of the heat exchanger housing and the second end of the sensor housing is disposed outside of the heat exchanger housing.

14. The heat exchanger system of claim 13 further comprising a lock nut threadably attached near the first end of the sensor housing and outside of the heat exchanger housing.

15. The heat exchanger system of claim 13 wherein the second end of the sensor housing comprises at least one mounting tab projecting from the second end of the sensor housing; and
a fastener attaching the at least one mounting tab to the heat exchanger housing.

16. The heat exchanger system of claim 13 wherein the sensor housing comprises one of a straight-walled hollow tube, a bent-walled hollow tube having an angled portion and a hollow tube having a ninety degree elbow.

17. The heat exchanger system of claim 13 wherein the first end of the sensor housing further comprises a membrane positioned on an inside surface of the sensor housing adjacent to the plurality of openings.

18. A refrigerant sensor comprising:
a sensor controller;
a high-concentration refrigerant gas sensor in electrical communication with the sensor controller, the high-concentration refrigerant gas sensor calibrated to detect a first concentration of a refrigerant in air by volume of about 0.01 percent to about 100 percent and configured to communicate a first output signal to the sensor controller;
a low-concentration refrigerant gas sensor in electrical communication with the sensor controller, the low-concentration refrigerant gas sensor calibrated to detect a second concentration of the refrigerant in air by volume of about 0.001 percent to about 10 percent and configured to communicate a second output signal to the sensor controller;
wherein the sensor controller is configured to receive the first output signal and the second output signal, and to at least one of produce a sensor controller output signal, to activate a warning light, to activate a ventilation system, or a combination thereof, responsive to at least one of the first output signal and the second output signal;
a sensor housing having an interior space and enclosing the sensor controller, the high-concentration refrigerant gas sensor and the low-concentration refrigerant gas sensor, the sensor housing including a first end and a second end and a barrier disposed between the first end and the second end and sealingly separating the interior space at the first end from the interior space at the second end, the first end of the sensor housing supporting both the high-concentration refrigerant gas sensor and the low-concentration refrigerant gas sensor, and the second end of the sensor housing supporting the sensor controller, the sensor housing at the first end including a plurality of openings exposing the interior space of the sensor housing at the first end and the high-concentration refrigerant gas sensor and the low-concentration refrigerant gas sensor to an environment external to the sensor housing, the sensor housing at the second end substantially separating the interior space of the sensor housing at the second end and the sensor controller from the environment external to the sensor housing;
wherein the sensor controller is configured to determine whether the first output signal indicates the first concentration of the refrigerant is greater than a first threshold and to determine whether the second output signal indicates the second concentration of the refrigerant is greater than a second threshold;
wherein the first threshold is between about 1 percent and about 25 percent; and
wherein the second threshold is between about 0.001 percent and 10 percent.

19. The refrigerant sensor of claim 18 wherein the first end of the housing further comprises a membrane positioned on an inside surface of the housing adjacent to the plurality of openings.

20. The refrigerant sensor of claim 19 wherein the sensor housing comprises one of a straight-walled, hollow tube, a bent-walled hollow tube having an angled portion and a hollow tube having a ninety degree elbow.

* * * * *